United States Patent
Wilson

(10) Patent No.: US 9,639,391 B2
(45) Date of Patent: *May 2, 2017

(54) SCALING PAST THE JAVA VIRTUAL MACHINE THREAD LIMIT

(71) Applicant: International Business Machines Corporation, Armonk, NY (US)

(72) Inventor: Russell I. Wilson, Uffculme (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,326

(22) Filed: Sep. 7, 2016

(65) Prior Publication Data

US 2017/0060618 A1    Mar. 2, 2017

Related U.S. Application Data

(63) Continuation of application No. 15/099,040, filed on Apr. 14, 2016, now Pat. No. 9,513,940, which is a continuation of application No. 14/833,181, filed on Aug. 24, 2015.

(51) Int. Cl.
G06F 9/455   (2006.01)

(52) U.S. Cl.
CPC .................. G06F 9/45558 (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,374,286 | B1 | 4/2002 | Gee et al. |
| 7,426,720 | B1 | 9/2008 | Fresko |
| 7,577,951 | B2 | 8/2009 | Partamian et al. |
| 7,689,989 | B2 | 3/2010 | Dostert et al. |
| 8,464,224 | B2 | 6/2013 | Dulip et al. |
| 8,782,215 | B2 | 7/2014 | Pechanec et al. |
| 8,813,051 | B2 | 8/2014 | Dawson et al. |
| 9,513,940 | B1 | 12/2016 | Wilson |
| 2003/0033344 | A1 | 2/2003 | Abbott et al. |
| 2005/0138623 | A1 | 6/2005 | Fresko |
| 2005/0172171 | A1 | 8/2005 | Kadashevich |
| 2005/0198263 | A1 | 9/2005 | Kadashevich |
| 2005/0235284 | A1 | 10/2005 | Kadashevich |
| 2006/0005200 | A1 | 1/2006 | Vega et al. |
| 2008/0046673 | A1 | 2/2008 | Hwang |
| 2014/0047272 | A1 | 2/2014 | Breternitz et al. |

(Continued)

OTHER PUBLICATIONS

Wilson; U.S. Appl. No. 14/833,181, filed Aug. 24, 2015; Entitled "Scaling Past the Java Virtual Machine Thread Limit".

(Continued)

*Primary Examiner* — Gregory A Kessler
(74) *Attorney, Agent, or Firm* — Walter L. Rudberg

(57) ABSTRACT

Embodiments of the present invention provide efficient systems and methods for scaling past the Java Virtual Machine (JVM) thread limit in a Java Virtual Machine. Embodiments of the present invention can be used to ensure that a received workload is executed, even if the workload is greater than a JVM thread limit of the system, by spawning a reduced number of threads from a main process, in order to provide enough resources for the effective execution of a received workload.

1 Claim, 3 Drawing Sheets

(56) References Cited

U.S. PATENT DOCUMENTS

2014/0068610 A1   3/2014   Baluch et al.
2015/0205588 A1   7/2015   Bates et al.

OTHER PUBLICATIONS

Wilson; U.S. Appl. No. 15/099,040, filed Apr. 14, 2016; Entitled "Scaling Past the Java Virtual Machine Thread Limit".
Wilson; U.S. Appl. No. 15/258,278, filed Sep. 7, 2016; Entitied "Scaling Past the Java Virtual Machine Thread Limit".
IBM Appendix P.: "List of IBM Patents or Patent Applications Treated As Related"; Dated Dec. 15, 2016; 2 pages.

– 1 –

SCALING PAST THE JAVA VIRTUAL MACHINE THREAD LIMIT

BACKGROUND OF THE INVENTION

The present invention relates generally to the field of Java Virtual Machines, and more particularly to methods for scaling past the Java Virtual Machine thread limit.

The Java virtual machine (JVM) is an abstract computer. Its specification defines certain features each JVM must have, but leaves many choices to the designers of each implementation. For example, although all JVMs much be able to execute Java bytecodes, they may use any techniques to execute them. The flexible nature of the JVMs specification enables it to be implemented on a wide variety of computers and devices.

Working with a product written in Java, which provides a remote interface via a Java API and a local interface via Java Native Invocation (JNI), a custom-built framework can be developed to performance test a product.

SUMMARY

According to one embodiment of the present invention, a method is provided, the method comprising: receiving, by a first Java Virtual Machine (JVM) process, a workload for an application; determining, by the first JVM process, whether the workload for the application is above a threading limit; and responsive to determining that the workload for the application is above the threading limit, determining at least one sub-process from the first JVM process.

Another embodiment of the present invention provides a computer program product, based on the method described above.

Another embodiment of the present invention provides a computer system, based on the method described above.

DETAILED DESCRIPTION

Embodiments of the present invention provide systems and methods to scale past the JVM architectural limits by spawning a number of JVM sub-processes from a single JVM process, in order to generate a requested amount of workload for a target application.

Figure 1A:
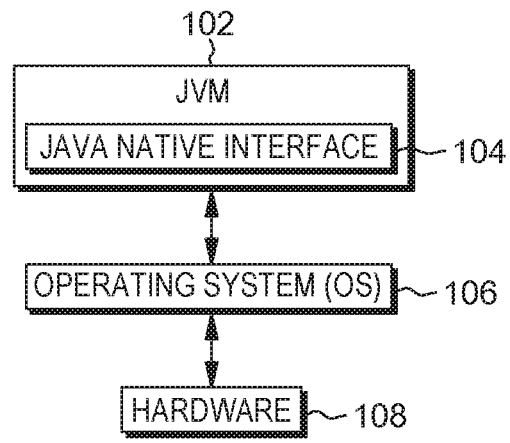
FIG. 1A depicts a functional block diagram illustrating a Java Virtual Machine (JVM) including a hardware and operating system (OS) architecture, in accordance with an embodiment of the present invention.

The present invention will now be described in detail with reference to the Figures. FIG. 1A depicts a functional block diagram illustrating a Java Virtual Machine (JVM) including a hardware 108 and operating system (OS) 106 architecture, in accordance with an embodiment of the present invention.

JVM 102 can receive program code (compiled as "Java bytecode"). JVM 102 can translate the received Java bytecode into native operating system calls and machine instructions for execution on the underlying platform (i.e., OS 106 and hardware 108). JVM 102 may support Java Native Interface (JNI) 104 as a mechanism to enable the Java bytecode, to call methods written in native code (e.g., C and C++) and vice versa. Native code may be written for the underlying hardware 108 and OS 106 platform. JNI 104 may allow a developer to write native methods to handle situations where an application cannot be written entirely in the Java programming language. JNI 104 may also be used to modify an existing application (written in another programming language) in order to be accessible to Java applications.

Figure 1B:
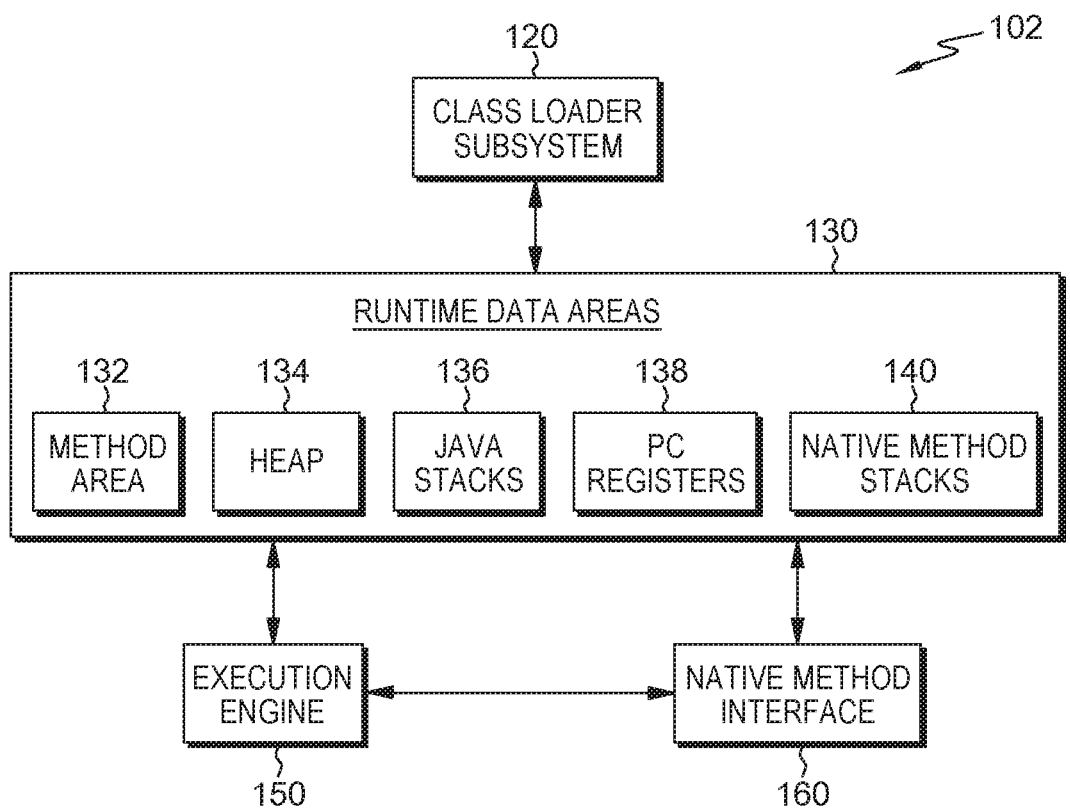
FIG. 1B depicts a functional block diagram illustrating the internal architectural components of a Java Virtual Machine, in accordance with an embodiment of the present invention.

FIG. 1B depicts a functional block diagram illustrating the internal architectural components of JVM 102, in accordance with an embodiment of the present invention.

JVM 102 includes class loader subsystem 120, execution engine 150, and runtime data areas 130. JVM 102 can load class files and execute the bytecodes contained within the class files. Class loader subsystem 120 loads class files from both the program and the Java API. The files from the Java API, which are required by a running program, are loaded into the virtual machine.

Execution engine 150 may vary between different implementations. In a JVM implemented in software, execution engine 150 interprets the bytecodes one by one. In various embodiments of the present invention, execution engine 150 may be any known execution engine in the art, which executes the bytecodes.

JVM 102 organizes the memory required to execute a program into runtime data areas 130. In this exemplary embodiment, runtime data areas 130 includes method area 132, heap 134, Java stacks 136, PC registers 138, and native method stacks 140. Each instance of JVM 102 includes one method area 132 and one heap 134. Method area 132 (which includes class data) and heap 134 (which includes objects) are shared by all threads running inside JVM 102.

As each new thread is formed, each thread has its own PC register (program counter) 138 and Java stacks 136. A value of PC register 138 indicates the next instruction to execute, if the thread is executing a Java method (i.e., not a native method). A thread's Java stacks 136 stores the state of Java method invocations for the thread, which includes local variables, the parameters with which it was invoked, its return value (if any), and intermediate calculations. The state of native method invocations is stored in an implementation-dependent way in native method stacks 140, as well as in registers or other implementation-dependent memory areas. Java stacks 136 are composed of stack frames, which contain the state of one Java method invocation.

Figure 1C:
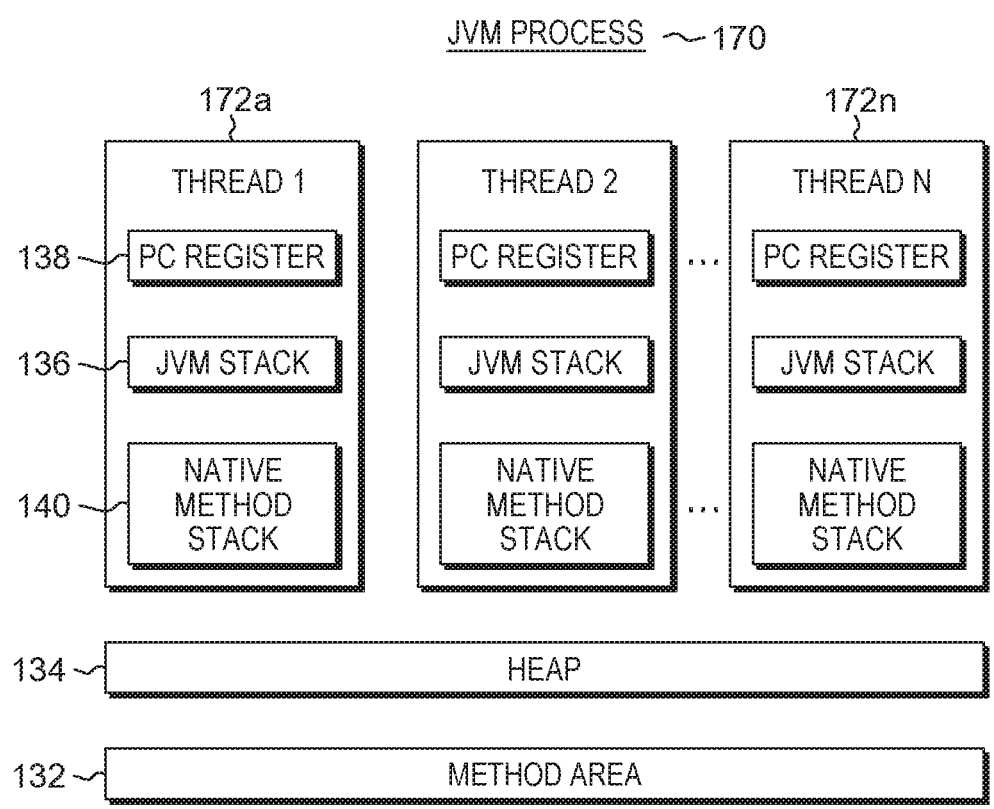
FIG. 1C depicts a block diagram of an example of a JVM process running on the JVM of FIG. 1B, in accordance with an embodiment of the present invention.

FIG. 1C depicts a block diagram of an example of a JVM process running on JVM 102 of FIG. 1B, in accordance with an embodiment of the present invention.

JVM process 170 is an example of one JVM process, and in this exemplary embodiment, more than one JVM process can execute on either the same system or different systems. In this exemplary embodiment, JVM process 170 is a 32-bit JVM. JVM process 170 can have a self-contained execution environment. Each JVM process 170 has its own memory space. JVM process 170 may communicate with other processes using inter-process communication (IPC). In this exemplary embodiment, JVM process 170 is capable of spawning one or more new sub-processes, each with a reduced number of threads.

JVM process 170 includes threads 172a-n. Threads 172a-n share the resources of JVM process 170, including memory and open files. Threads 172a-n are limited in number, depending on the JVM process under which they are running. One heap instance, heap 134, is shared by all of threads 172a-n, while each of threads 172a-n has its own JVM stack 136, PC register 138, and native method stack 140.

Figure 2:
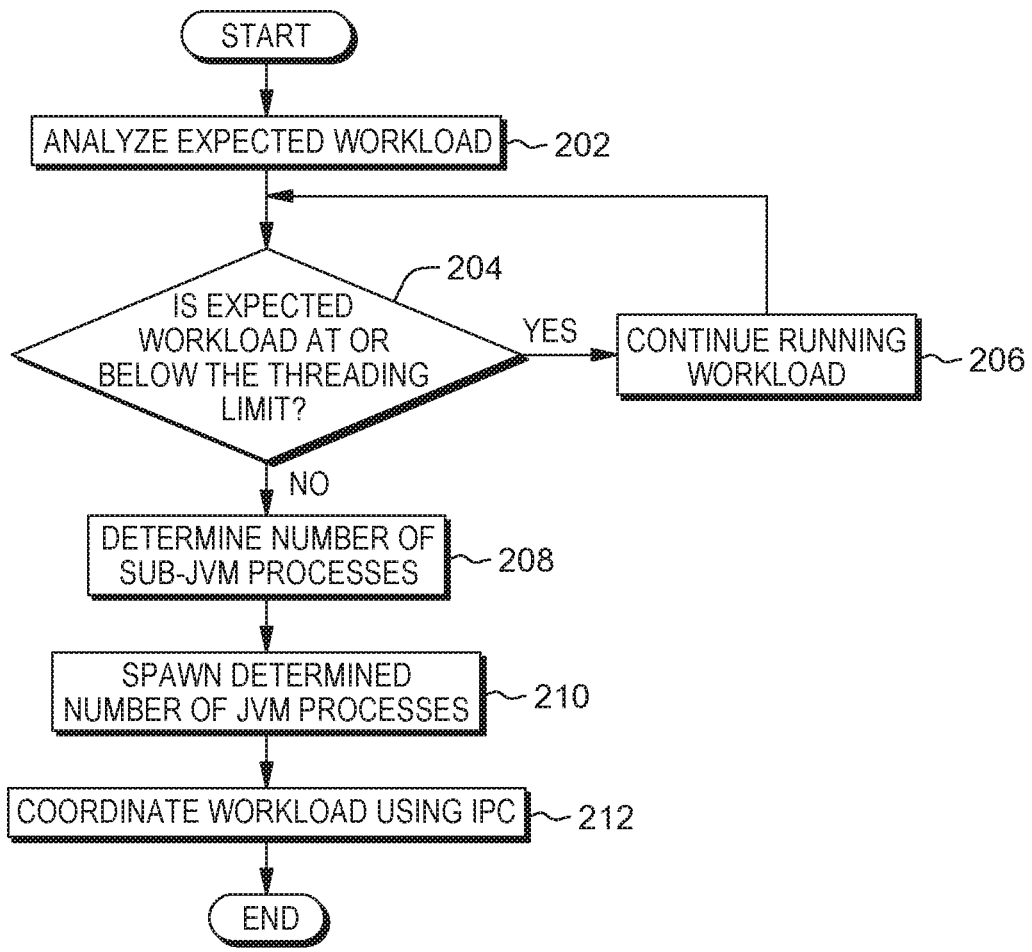
FIG. 2 depicts a flowchart illustrating operational steps for spawning a number of JVM instances dependent on a workload, in accordance with an embodiment of the present invention.

FIG. 2 depicts a flowchart illustrating operational steps for spawning a number of JVM instances dependent on a workload, in accordance with an embodiment of the present invention.

In step 202, JVM process 170 analyzes the expected workload. JVM process 170 is the main (first) process from which other processes may be spawned. In this exemplary embodiment, JVM process 170 may know the threading limit of the JVM it is running under, by querying the properties of the JVM. In other embodiments, the threading limit is hard-coded by the application developer in the JVM, so that JVM process 170 is aware of the threading limit.

In step 204, JVM process 170 determines whether the expected workload is at, or below, the threading limit. In this exemplary embodiment, JVM process 170 analyzes the expected workload that is to be run against the threading limit, in order to determine whether the expected workload is above, or below, the predetermined threading limit.

If, in step 204, JVM process 170 determines that the expected workload is at, or below, the threading limit, then in step 206, JVM process 170 can continue to run the workload itself (i.e., no additional resources are required to run the expected workload). In some embodiments, JVM process 170 can spawn a single JVM instance to run the expected workload.

If, in step 204, JVM process 170 determines that the expected workload is not at, or below, the threading limit (i.e., expected workload is greater than the threading limit), then, in step 208, JVM process 170 determines a number of sub-JVM processes. In this exemplary embodiment, the number of sub-JVM processes is based partially on the size of the expected workload. For example, a larger expected workload may require a larger number of sub-JVM processes than a smaller expected workload.

In step 210, JVM process 170 spawns the determined number of sub-JVM processes needed to execute the expected workload. In this exemplary embodiment, each spawned sub-JVM process can operate within the limits of a 32-bit JVM and can provide the effective workload of a single 'large threaded' JVM. The determined number of sub-JVM processes may be spawned from JVM process 170 using any JVM spawning methods or processes known in the art.

In step 212, JVM process 170 coordinates the new workload using a suitable inter-process communication (IPC) method. To facilitate communication between processes, most operating systems support inter-process communication (IPC) resources, such as pipes and sockets. IPC may be used for communication between processes of the same system, as well as between different systems. For example, a suitable IPC method may include remote method invocation (RMI), or any other Java communication methods known in the art.

By performing the operational steps of FIG. 2, a number of JVM instances can each spawn a reduced number of threads to provide an effective execution of a received workload. The process can ensure that a received workload is executed, even if the workload is greater than the JVM thread limit of the system.

Figure 3:
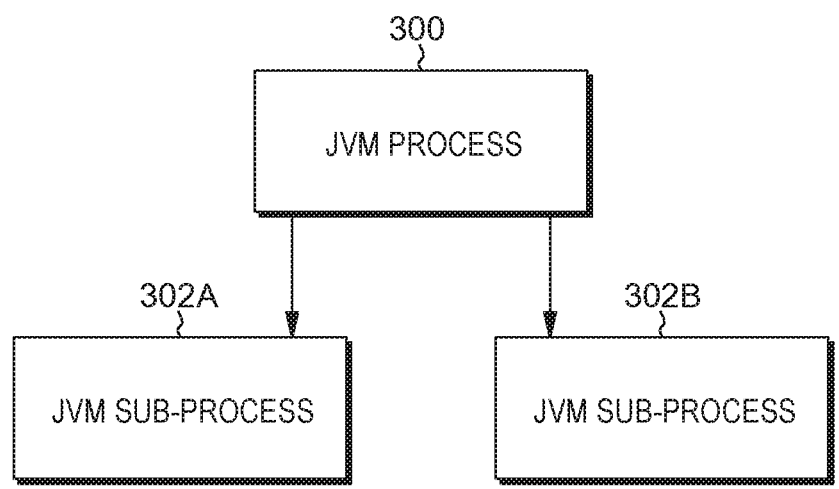
FIG. 3 depicts a block diagram of a JVM process spawning new sub-JVM processes, in accordance with an embodiment of the present invention.

FIG. 3 depicts a block diagram of a JVM process spawning new sub-JVM processes, in accordance with an embodiment of the present invention.

In this exemplary embodiment, JVM process 300 is the main (original) process. At the time that JVM process 300 detects that it is approaching the threading limits of the JVM (i.e., step 204, No branch), JVM process 300 can spawn one or more new JVM sub-processes (i.e., JVM sub-processes 302A and 302B). JVM sub-processes 302A and 302B can each communicate with JVM process 300, and each JVM sub-process can operate within the limits of the 32-bit JVM.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:

one or more computer processors;

one or more non-transitory computer readable storage media;

program instructions stored on the one or more non-transitory computer readable storage media for execution by at least one of the one or more processors, the program instructions comprising:

program instructions to receive, by a first Java Virtual Machine (JVM) process, a workload for an application, wherein the first JVM process comprises a 32-bit JVM;

program instructions to determine, by a first Java Virtual Machine (JVM) process, whether the workload for the application is above a threading limit;

responsive to the program instructions determining that the workload for the application is above the threading limit, program instructions to determine at least one sub-process from the first JVM process wherein the at least one sub-process from the first JVM process comprises a 32-bit JVM, and wherein a number of the at least one sub-process from the first JVM process is based in part on the workload for the application and wherein each of the at least one sub-process configured to communicate with the first JVM process;

program instructions to spawn by the first JVM process, the determined at least one sub-process from the first JVM process, based on the workload for the application; and program instructions to coordinate, by the first JVM process, the received workload for the application, using inter-process communication (IPC), wherein IPC includes remote method invocation (RMI).

* * * * *